(12) United States Patent
Schlotterbeck et al.

(10) Patent No.: US 10,724,915 B2
(45) Date of Patent: Jul. 28, 2020

(54) STATIC PRESSURE MEASUREMENT PROBE SYSTEM AND ASSOCIATED METHOD

(71) Applicant: THALES, Courbevoie (FR)

(72) Inventors: Jean-Pierre Schlotterbeck, Rochefort-Samson (FR); Jean-Philippe Pineau, Landes le Gaulois (FR)

(73) Assignee: THALES, Courbevoie (FR)

( * ) Notice: Subject to any disclaimer, the term of this patent is extended or adjusted under 35 U.S.C. 154(b) by 210 days.

(21) Appl. No.: 15/990,485

(22) Filed: May 25, 2018

(65) Prior Publication Data

US 2018/0356309 A1    Dec. 13, 2018

(30) Foreign Application Priority Data

Jun. 8, 2017  (FR) ..................... 17 00605

(51) Int. Cl.
*G01P 5/26* (2006.01)
*G01P 21/00* (2006.01)
*G01C 5/06* (2006.01)
*G01L 19/00* (2006.01)
*G01S 17/88* (2006.01)
(Continued)

(52) U.S. Cl.
CPC ............ *G01L 19/0007* (2013.01); *G01C 5/06* (2013.01); *G01L 19/0092* (2013.01); *G01L 27/002* (2013.01); *G01P 5/14* (2013.01); *G01P 5/26* (2013.01); *G01P 13/025* (2013.01); *G01P 21/025* (2013.01); *G01S 17/88* (2013.01); *G01S 17/58* (2013.01)

(58) Field of Classification Search
CPC .... G01P 5/26; G01P 5/24; G01P 5/241; G01P 5/242; G01P 5/244; G01P 5/245; G01P 5/247; G01P 5/248
See application file for complete search history.

(56) References Cited

U.S. PATENT DOCUMENTS 5,090,801 A    2/1992  Johnson
5,259,234 A   11/1993  Keller et al.
(Continued)

FOREIGN PATENT DOCUMENTS

FR    3 035 209 A1    10/2016
WO   2014/019720 A1    2/2014

OTHER PUBLICATIONS

S. Becker et al., "LDA system for in-flight local velocity measurements on airplane wings," Instrumentation in Aerospace Simulation Facilities, Jun. 14, 1999, pp. 25/1-25/7, XP010374458.

*Primary Examiner* — Herbert K Roberts
(74) *Attorney, Agent, or Firm* — Baker & Hostetler LLP

(57) ABSTRACT

A static pressure measurement probe system comprises: a base to be fixed onto the cockpit of an aircraft; at least one local pressure tapping formed through the base and coupled to a pressure measurement sensor; for each local pressure tapping, at least two assemblies each comprising an optical window that is transparent to a laser radiation and a laser anemometry probe configured to take anemometry measurements in an imaginary cylinder centred on the local pressure tapping and of a diameter less than 3 cm and of a height less than 4 cm counted from the outer end of the local pressure tapping, so that the measurements are within the airflow limit layer.

6 Claims, 1 Drawing Sheet

(51) Int. Cl.
  *G01L 27/00*   (2006.01)
  *G01P 13/02*   (2006.01)
  *G01P 21/02*   (2006.01)
  *G01P 5/14*    (2006.01)
  *G01S 17/58*       (2006.01)

(56)         References Cited

U.S. PATENT DOCUMENTS

2006/0262324 A1*  11/2006  Hays ..................... G01N 21/47
                                                    356/519
2012/0078540 A1*  3/2012   McIntyre ................. G01P 5/16
                                                    702/50
2015/0094976 A1   4/2015   Cooper et al.
2015/0168439 A1*  6/2015   Genevrier ................ G01P 5/02
                                                    356/28
2018/0269646 A1*  9/2018   Welford .................. G01S 17/42

* cited by examiner

STATIC PRESSURE MEASUREMENT PROBE SYSTEM AND ASSOCIATED METHOD

CROSS-REFERENCE TO RELATED APPLICATIONS

This application claims priority to foreign French patent application No. FR 1700605, filed on Jun. 8, 2017, the disclosure of which is incorporated by reference in its entirety.

FIELD OF THE INVENTION

The present invention relates to a static pressure measurement probe system and an associated method.

The present invention lies within the field of anemobarometry for aeroplanes (military or civilian).

BACKGROUND

A fundamental law of thermodynamics governs lift and therefore the support capacity in the air:

$$F_z = \tfrac{1}{2} \rho V^2 S C_z$$

in which:
$F_z$ represents the lift, in N;
$\rho$ represents the density of the fluid, in this case air, in kg/m$^3$;
V represents the velocity of the probe system relative to the surrounding air, in m/s;
S represents a surface exposed to the airflow, in m$^2$;
$C_z$ represents an adimensional lift coefficient.

Conventionally, it is known practice to not measure the density p of the air or the true air speed or TAS, because a simpler method has been used since the beginnings of aviation based on the conventional speed or CAS, the acronym for "Calibrated AirSpeed", obtained by a difference between a total pressure (stop pressure) supplied by a Pitot probe and a static pressure tapped tangentially to the airflow, considered as close as possible to the ambient pressure in the absence of the aeroplane.

The anemobarometric measurement systems installed on military or civilian aeroplanes exhibit measurements that are likely to be falsified in the case of icing, because of the protuberant nature of the probes used, such as Pitot probes, incidence probes and sideslip probes. Use is therefore conventionally made of devices for de-icing and preventing icing of these probes by reheating, which can result in problems of reliability and lead to a significant electrical consumption.

It is known practice to mitigate these problems by means of flush systems (non-protuberant systems) that for example use:

the parietal technology, i.e. a plurality of local pressure probes (taking a pressure more or less close to the static pressure) distributed over the skin of the aircraft, which, combined with a complex calibration and subject to major installation precautions makes it possible to provide the static pressure, the angle of incidence or AOA, the acronym for "Angle Of Attack", the conventional speed or CAS, the acronym for "Calibrated AirSpeed", and the SideSlip Angle, or SSA;

the LiDAR (the acronym for "Light Detection and Ranging") technology that makes it possible to perform a direct measurement of the air speed outside of the 3D (vectorial) limit layer using laser beams, making it possible to then obtain the True AirSpeed TAS, the Angle Of Attack AOA and the SideSlip Angle SSA;

the technology based on ultrasound probes which provides vector speed information; and the hybrid technology which combines several of the technologies cited above, for example FR2994273 or FR3035209 thus creating multifunction probes.

These non-protuberant systems exhibit drawbacks of high cost, of installation difficulty because they are generally sensitive to the imperfections of the aeroplane skin, and sometimes of completeness of the flight domain.

Furthermore, in the military field, electromagnetic and thermal stealth are an additional issue, because the reheated protuberant probes exhibit a significant RADAR echo and an infrared-detectable thermal emission.

SUMMARY OF THE INVENTION

One aim of the invention is to mitigate the abovementioned problems.

There is proposed, according to one aspect of the invention, a static pressure measurement probe system comprising:

a base intended to be fixed onto the cockpit of an aircraft;
at least one local pressure tapping formed through the base and coupled to a pressure measurement sensor;
for each local pressure tapping, at least two assemblies each comprising an optical window that is transparent to a laser radiation and a laser anemometry probe configured to take anemometry measurements in an imaginary cylinder centred on the static pressure tapping and of a diameter less than 3 cm and of a height less than 4 cm counted from the outer end of the local pressure tapping, so that the measurements are within the airflow limit layer, to compensate the effects of the measured local air speed on the static pressure.

Such a local pressure measurement probe system is insensitive to icing and is more resistant to wear and to impacts.

Furthermore, this system remains efficient throughout the flight domain of a manoeuvring military aircraft, has a RADAR signature and a thermal signature that are low, all at a reduced cost.

In one embodiment, the two assemblies, the local pressure tapping and the pressure measurement sensor are arranged in an imaginary cylinder, centred on the pressure tapping, and of a diameter less than 20 cm.

Thus, there are no longer pneumatic tubes to be installed in the aeroplane to link the sensor to the probe.

In one embodiment, the laser anemometry probes are micro-lidars.

Thus, it is possible to obtain the components of the air speed vector as close as possible (a few cm at most) to the local pressure measurement hole.

For example, the micro-lidars are configured to emit a laser radiation at a wavelength of between 1.4 μm and 1.8 μm and of optical power lying between 1 W and 5 W.

In one embodiment, the optical windows have a diameter at most equal to 3 cm.

There is also proposed, according to another aspect of the invention, an aircraft comprising a probe system as previously described.

There is also proposed, according to another aspect of the invention, a method for determining the static pressure by compensation of the measured local pressure by means of a measurement of the air speed at the measurement point.

Thus, it is possible to associate a pressure correction as a function of the modulus and of the orientation of the local airflow.

BRIEF DESCRIPTION OF THE DRAWINGS

The invention will be better understood on studying a few embodiments described as nonlimiting examples and illus-

DETAILED DESCRIPTION

Figure 1:
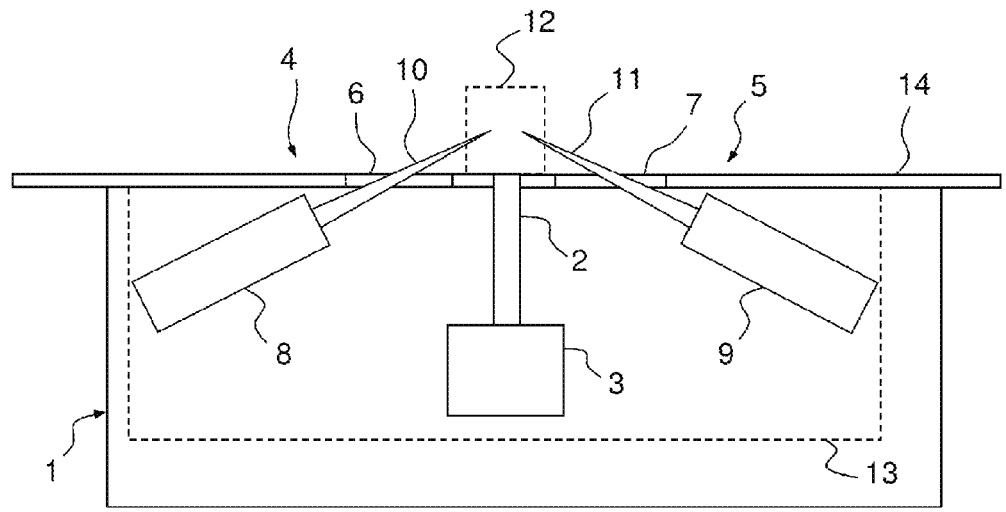

FIG. 1 shows, in a cross sectional view, a static pressure measurement probe system according to an aspect of the invention.

The static pressure measurement probe system comprises a base 1 intended to be fixed onto the cockpit of an aircraft, and at least one local pressure tapping 2 formed through the base and coupled to a pressure measurement sensor 3, in this case a single local pressure tapping 2 is represented.

For each local pressure tapping, in this case the single local pressure tapping 2, two assemblies 4, 5 each comprise a respective optical window 6, 7 that is transparent to a laser radiation and a laser anemometry probe 8, 9 configured to take anemometry measurements by means of their laser beam 10, 11 in an imaginary cylinder 12 centred on the local pressure tapping 2 and of a diameter less than 3 cm and of a height less than 4 cm counted from the outer end of the local pressure tapping 2, so that the measurements are within the airflow limit layer, to compensate the effects of the measured local air speed on the static pressure.

Preferentially, the two assemblies 4, 5, the static pressure tapping 2 and the pressure measurement sensor 3 are arranged in an imaginary cylinder 13 internal to the probe system, centred on the pressure tapping 2, and of a diameter less than 20 cm.

The laser anemometry probes 8, 9 can be Doppler micro-lidars that make it possible to perform the measurement of the projections of the local air speed vector on the optical axes (laser beam 10,11).

Such micro-lidars can emit a laser at a wavelength of between 1.4 μm and 1.8 μm and of optical power lying between 1 W and 5 W.

An aeroplane skin plate 14, comprising optical windows 6, 7, covers the outer part of the probe system, intended to be located on the outer surface of the aircraft on which it is intended to be mounted. This plate is conventionally designed to minimize the local turbulences of the airflow in the vicinity of the pressure tapping which will have the effect of simplifying the law of local pressure measurement correction from the air speed measurement performed by the lidars.

Figure 2:
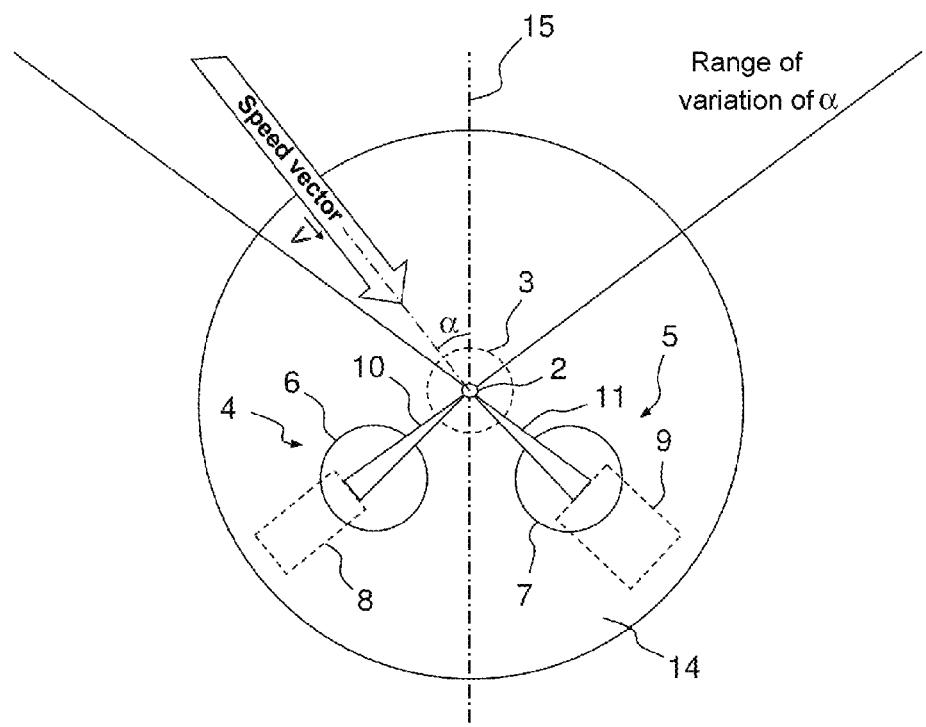

FIG. 2 shows, in a plan view, the static pressure measurement probe assembly of FIG. 1, as well as an angle α between the speed vector $\vec{V}$ of the air and a reference axis 15 of the probe assembly.

The local speed vector, at the measurement hole of the static pressure Ps tapping 2, is practically parallel to the aeroplane skin plate 14 covering the probe system. The flight domain varies this vector in modulus and in angle α relative to the reference axis of the probe system. Upon the installation of the probe system, it is essential to ensure that the range of variation of α does not exceed the angle made between them by the axes of measurement of the laser anemometry probes 8, 9, because each laser anemometry probe 8, 9 performs a measurement of the conventionally unsigned projection $V_8$ and $V_9$ of the vector on its axis, in order to avoid ambiguity in the computation of the angle α.

Having two components on the two measurement axes of the two respective laser beams 10, 11, it is possible to compute (with the index "$_{loc}$" meaning that each probe 8, 9 takes a different measurement which depends on its place of installation or of location), the following elements:

the modulus of the speed vector: $V_{loc}$ the angle (signed) $α_{loc}$ relative to the reference axis of the probe system;

if the angle between the laser anemometry probes 7 and 8 is 90° and the measurement axes of the probes are symmetrical relative to the reference axis, $$V_{loc}=(V_8^2+V_9^2)^{0.5}$$

$$α_{loc}=\text{Arctan}(V_8/V_9)-45°$$

In in-flight testing, a correction of the static pressure measurement $Ps_{loc}$ with the computed angle $α_{loc}$ and the modulus of the local speed $V_{loc}$ is identified. In a simple (first order) case, it is possible to give a relationship of the type:

$$Ps_{corrected}=Ps_{measured}+a·V_{loc}+b·α_{loc}$$

It is also possible to envisage a more complex correction resulting from a second order calibration taking into account terms in $V_{loc}^2$ and $α_{loc}^2$ and/or crossed $V_{loc}·α_{loc}$.

For the orders of magnitude, it is considered that the range of variation of α is +/−45° around the reference axis 15, that the point of convergence of the axes of the laser beams 10, 11 of the laser anemometry probes 8, 9 is situated at a distance from the pressure measurement hole or static pressure tapping 2 lying between 1 and 3 cm, and that the diameter of the optical windows or portholes 6, 7 is at most equal to 3 cm.

The invention claimed is:

1. A static pressure measurement probe system comprising:
    a base intended to be fixed onto the cockpit of an aircraft;
    at least one local pressure tapping formed through the base and coupled to a pressure measurement sensor;
    for each local pressure tapping, at least two assemblies each comprising an optical window that is transparent to a laser radiation and a laser anemometry probe configured to take anemometry measurements in an imaginary cylinder centered on the local pressure tapping and of a diameter less than 3 cm and of a height less than 4 cm counted from the outer end of the local pressure tapping, so that the measurements are within the airflow limit layer, to compensate for effects of the measured local air speed on a static pressure measured by the pressure measurement sensor.

2. The system according to claim 1, wherein the two assemblies, the local pressure tapping and the pressure measurement sensor are arranged in a second imaginary cylinder, centered on the pressure tapping, and of a diameter less than 20 cm.

3. The system according to claim 1, wherein the laser anemometry probes are micro-lidars.

4. The system according to claim 3, wherein the micro-lidars are configured to emit a laser radiation at a wavelength of between 1.4 μm and 1.8 μm and of optical power lying between 1 W and 5 W.

5. The system according to claim 1, wherein the optical windows have a diameter at most equal to 3 cm.

6. An aircraft comprising a probe system according to claim 1.

* * * * *